(12) United States Patent
Singh

(10) Patent No.: US 10,332,642 B2
(45) Date of Patent: Jun. 25, 2019

(54) APPARATUS FOR STORING AND/OR TRANSPORTING HIGH LEVEL RADIOACTIVE WASTE, AND METHOD FOR MANUFACTURING THE SAME

(71) Applicant: Holtec International, Marlton, NJ (US)

(72) Inventor: Krishna P. Singh, Hobe Sound, FL (US)

(73) Assignee: Holtec International

( * ) Notice: Subject to any disclaimer, the term of this patent is extended or adjusted under 35 U.S.C. 154(b) by 1060 days.

(21) Appl. No.: 14/452,185

(22) Filed: Aug. 5, 2014

(65) Prior Publication Data

US 2014/0341330 A1     Nov. 20, 2014

Related U.S. Application Data

(62) Division of application No. 12/774,944, filed on May 6, 2010, now Pat. No. 8,798,224.

(Continued)

(51) Int. Cl.
| | |
|---|---|
| *G21C 19/00* | (2006.01) |
| *G21C 19/06* | (2006.01) |
| *G21F 5/005* | (2006.01) |
| *G21F 5/10* | (2006.01) |
| *G21F 5/12* | (2006.01) |

(52) U.S. Cl.
CPC ............. *G21C 19/06* (2013.01); *G21F 5/005* (2013.01); *G21F 5/10* (2013.01); *G21F 5/12* (2013.01); *Y10T 29/49* (2015.01); *Y10T 29/49826* (2015.01)

(58) Field of Classification Search
CPC . G21F 5/00; G21F 5/005; G21F 5/008; G21F 5/06; G21F 5/12

USPC .......... 376/272–274, 347; 250/505.1, 506.1, 250/507.1, 515.1, 273; 220/476, 484, (Continued)

(56) References Cited

U.S. PATENT DOCUMENTS

| 3,111,078 A | 11/1963 | Breckenridge |
| 3,111,566 A | 11/1963 | Rogers |

(Continued)

FOREIGN PATENT DOCUMENTS

| CN | 1345453 | 4/2002 |
| DE | 2821780 | 11/1979 |

(Continued)

OTHER PUBLICATIONS

International Atomic Energy Agency, "Multi-purpose container technologies for spent fuel management," Dec. 2000 (IAEA-TECDOC-1192) pp. 1-49.

(Continued)

*Primary Examiner* — Marshall P O'Connor
(74) *Attorney, Agent, or Firm* — The Belles Group, P.C.

(57) ABSTRACT

A system for storing and/or transporting high level radioactive waste, and a method of manufacturing the same. In one aspect, the invention is a ventilated vertical overpack ("VVO") having specially designed inlet ducts that refract radiation back into the storage cavity. A clear line-of-sight does not exist through the inlet ducts and, thus, the canister can be supported on the floor of the VVO. Also disclosed is a method of manufacturing a variable height VVO that falls within a regulatory license previously obtained for a shorter and taller version of the VVO.

9 Claims, 11 Drawing Sheets

Related U.S. Application Data

(60) Provisional application No. 61/175,899, filed on May 6, 2009.

(58) Field of Classification Search
 USPC ........... 220/592.01; 427/393.6; 588/1, 3, 20, 588/249
 See application file for complete search history.

(56) References Cited

U.S. PATENT DOCUMENTS

| | | |
|---|---|---|
| 3,397,113 A | 6/1968 | Stafford |
| 3,563,263 A | 2/1971 | Benson |
| 3,629,062 A | 12/1971 | Muenchow |
| 3,739,451 A | 6/1973 | Jacobson |
| 3,745,707 A | 7/1973 | Herr |
| 3,755,079 A | 8/1973 | Weinstein et al. |
| 3,765,549 A | 10/1973 | Jones |
| 3,800,973 A | 4/1974 | Weaver |
| 3,836,267 A | 9/1974 | Schatz |
| 3,910,006 A | 10/1975 | James |
| 3,911,684 A | 10/1975 | Busey |
| 3,915,205 A | 10/1975 | Wagner et al. |
| 3,917,953 A | 11/1975 | Wodrich |
| 3,935,062 A | 1/1976 | Keller et al. |
| 3,945,509 A | 3/1976 | Weems |
| 3,962,587 A | 6/1976 | Dufrane et al. |
| 3,984,942 A | 10/1976 | Schroth |
| 3,996,976 A | 12/1976 | Hansel |
| 4,009,985 A | 3/1977 | Hirt |
| 4,055,508 A | 10/1977 | Yoli et al. |
| 4,078,968 A | 3/1978 | Golden et al. |
| 4,148,608 A | 4/1979 | Kaartinen |
| 4,158,599 A | 6/1979 | Andrews et al. |
| 4,247,315 A | 1/1981 | Neumann |
| 4,278,892 A | 7/1981 | Baatz et al. |
| 4,288,698 A | 9/1981 | Baatz et al. |
| 4,291,536 A | 9/1981 | Girard |
| 4,336,460 A | 6/1982 | Best et al. |
| 4,339,547 A | 7/1982 | Corbett et al. |
| 4,355,000 A | 10/1982 | Lumelleau |
| 4,356,146 A | 10/1982 | Knappe |
| 4,366,095 A | 12/1982 | Takats et al. |
| 4,394,022 A | 7/1983 | Gilmore |
| 4,450,134 A | 5/1984 | Soot et al. |
| 4,498,011 A | 2/1985 | Dyck et al. |
| 4,525,324 A | 6/1985 | Spilker et al. |
| 4,526,344 A | 7/1985 | Oswald et al. |
| 4,527,066 A | 7/1985 | Dyck et al. |
| 4,532,104 A | 7/1985 | Wearden et al. |
| 4,532,428 A | 7/1985 | Dyck et al. |
| 4,585,611 A | 4/1986 | Perl |
| 4,634,875 A | 1/1987 | Kugeler et al. |
| 4,635,477 A | 1/1987 | Simon |
| 4,649,018 A | 3/1987 | Waltersdorf |
| 4,663,533 A | 5/1987 | Kok et al. |
| 4,666,659 A | 5/1987 | Lusk |
| 4,671,326 A | 6/1987 | Wilhelm et al. |
| 4,683,533 A | 7/1987 | Shiozaki et al. |
| 4,690,795 A | 9/1987 | Hardin et al. |
| 4,764,333 A | 8/1988 | Minshall et al. |
| 4,780,269 A | 10/1988 | Fischer et al. |
| 4,800,062 A | 1/1989 | Craig et al. |
| 4,832,903 A | 5/1989 | Ealing |
| 4,834,916 A | 5/1989 | Chaudon et al. |
| 4,847,009 A | 7/1989 | Madle et al. |
| 4,851,183 A | 7/1989 | Hampel |
| 4,971,752 A | 11/1990 | Parker |
| 4,986,956 A | 1/1991 | Garabedian |
| 5,102,615 A | 4/1992 | Grande et al. |
| 5,182,076 A | 1/1993 | De Seroux et al. |
| 5,205,966 A | 4/1993 | Elmaleh |
| 5,265,133 A | 11/1993 | Matthews |
| 5,267,280 A | 11/1993 | Duquesne |
| 5,289,857 A | 3/1994 | Pyles |
| 5,297,917 A | 3/1994 | Freneix |
| 5,307,388 A | 4/1994 | Inkester et al. |
| 5,319,686 A | 6/1994 | Fizzano et al. |
| 5,325,896 A | 7/1994 | Koch et al. |
| 5,352,359 A | 10/1994 | Nagai et al. |
| 5,387,741 A | 2/1995 | Shuttle et al. |
| 5,421,160 A | 6/1995 | Gustafson et al. |
| 5,464,466 A | 11/1995 | Nanaji et al. |
| 5,469,936 A | 11/1995 | Lauga et al. |
| 5,498,825 A | 3/1996 | Stahl |
| 5,513,231 A | 4/1996 | Jones et al. |
| 5,513,232 A | 4/1996 | Jones et al. |
| 5,537,824 A | 7/1996 | Gustafson et al. |
| 5,546,436 A | 8/1996 | Jones et al. |
| 5,564,498 A | 10/1996 | Bochard |
| 5,633,904 A | 5/1997 | Gilligan et al. |
| 5,646,971 A | 7/1997 | Howe |
| 5,661,768 A | 8/1997 | Gilligan et al. |
| 5,753,925 A | 5/1998 | Yamanaka et al. |
| 5,763,735 A | 6/1998 | Stahl |
| 5,771,265 A | 6/1998 | Montazer |
| 5,852,643 A | 12/1998 | Copson |
| 5,862,195 A | 1/1999 | Peterson |
| 5,898,747 A | 4/1999 | Singh |
| 5,926,602 A | 7/1999 | Okura |
| 6,064,710 A | 5/2000 | Singh |
| 6,064,711 A | 5/2000 | Copson |
| 6,074,771 A | 6/2000 | Cubukcu et al. |
| 6,183,243 B1 | 2/2001 | Snyder |
| 6,252,923 B1 | 6/2001 | Iacovino et al. |
| 6,293,996 B1 | 9/2001 | Grantham et al. |
| 6,462,994 B2 | 9/2002 | Pennington |
| 6,489,623 B1 | 12/2002 | Peters et al. |
| 6,519,307 B1 * | 2/2003 | Singh .................. G21F 5/10 250/506.1 |
| 6,519,308 B1 | 2/2003 | Boardman |
| 6,718,000 B2 | 4/2004 | Singh et al. |
| 6,793,450 B2 | 9/2004 | Singh |
| 6,853,697 B2 | 2/2005 | Singh et al. |
| 6,953,496 B2 | 10/2005 | Grantham et al. |
| 7,068,748 B2 | 6/2006 | Singh |
| 7,294,375 B2 | 11/2007 | Taniuchi et al. |
| 7,330,526 B2 | 2/2008 | Singh |
| 7,590,213 B1 | 9/2009 | Singh |
| 7,676,016 B2 | 3/2010 | Singh |
| 7,933,374 B2 | 4/2011 | Singh |
| 8,351,562 B2 | 1/2013 | Singh |
| 2002/0003851 A1 | 1/2002 | Pennington |
| 2004/0067328 A1 | 4/2004 | Taniuchi et al. |
| 2004/0109523 A1 | 6/2004 | Singh et al. |
| 2004/0175259 A1 | 9/2004 | Singh et al. |
| 2004/0182246 A1 | 9/2004 | Singh et al. |
| 2005/0008462 A1 | 1/2005 | Singh et al. |
| 2005/0066541 A1 | 3/2005 | Singh |
| 2005/0207525 A1 | 9/2005 | Singh |
| 2005/0220256 A1 * | 10/2005 | Singh ................ G21C 19/06 376/272 |
| 2005/0220257 A1 | 10/2005 | Singh |
| 2006/0006351 A1 | 1/2006 | Timpert |
| 2006/0215803 A1 * | 9/2006 | Singh ................ G21F 5/002 376/272 |
| 2006/0251201 A1 | 11/2006 | Singh |
| 2006/0272175 A1 | 12/2006 | Singh |
| 2006/0288607 A1 | 12/2006 | Singh |
| 2007/0003000 A1 | 1/2007 | Singh et al. |
| 2008/0031396 A1 | 2/2008 | Singh et al. |
| 2008/0031397 A1 | 2/2008 | Singh et al. |
| 2008/0056935 A1 | 3/2008 | Singh |
| 2008/0069291 A1 | 3/2008 | Singh et al. |
| 2008/0076953 A1 | 3/2008 | Singh et al. |
| 2008/0084958 A1 | 4/2008 | Singh et al. |
| 2008/0260088 A1 | 10/2008 | Singh et al. |
| 2008/0265182 A1 | 10/2008 | Singh et al. |
| 2008/0314570 A1 | 12/2008 | Singh et al. |
| 2009/0069621 A1 | 3/2009 | Singh et al. |
| 2009/0158614 A1 | 6/2009 | Singh et al. |
| 2009/0159550 A1 | 6/2009 | Singh et al. |
| 2009/0175404 A1 | 7/2009 | Singh et al. |
| 2009/0198092 A1 | 8/2009 | Singh et al. |
| 2009/0252274 A1 | 10/2009 | Singh |

(56) References Cited

U.S. PATENT DOCUMENTS

| | | | |
|---|---|---|---|
| 2010/0028193 A1 | 2/2010 | Hanes, III | |
| 2010/0150297 A1 | 6/2010 | Singh | |
| 2010/0199667 A1 | 8/2010 | Ullman | |
| 2010/0212182 A1 | 8/2010 | Singh | |
| 2010/0232563 A1 | 9/2010 | Singh et al. | |
| 2010/0272225 A1 | 10/2010 | Singh | |
| 2010/0282448 A1 | 11/2010 | Singh et al. | |
| 2010/0282451 A1 | 11/2010 | Singh et al. | |
| 2010/0284506 A1 | 11/2010 | Singh et al. | |
| 2011/0021859 A1 | 1/2011 | Singh | |
| 2011/0033019 A1 | 2/2011 | Singh et al. | |
| 2011/0150164 A1 | 6/2011 | Singh et al. | |
| 2011/0172484 A1 | 7/2011 | Singh et al. | |
| 2011/0255647 A1 | 10/2011 | Singh | |
| 2011/0286567 A1 | 11/2011 | Singh et al. | |
| 2012/0037632 A1 | 2/2012 | Singh et al. | |
| 2012/0083644 A1 | 4/2012 | Singh | |
| 2012/0142991 A1 | 6/2012 | Singh | |
| 2012/0226088 A1 | 9/2012 | Singh et al. | |
| 2012/0294737 A1 | 11/2012 | Singh et al. | |
| 2012/0306172 A1 | 12/2012 | Singh | |
| 2012/0307956 A1 | 12/2012 | Singh et al. | |
| 2013/0070885 A1 | 3/2013 | Singh et al. | |
| 2013/0163710 A1 | 6/2013 | Singh | |

FOREIGN PATENT DOCUMENTS

| | | |
|---|---|---|
| DE | 3107158 | 1/1983 |
| DE | 3144113 | 5/1983 |
| DE | 3151475 | 6/1983 |
| DE | 3404666 | 8/1985 |
| DE | 19529357 | 8/1995 |
| DE | 3515871 | 11/1996 |
| EP | 0253730 | 1/1998 |
| EP | 1061011 | 12/2000 |
| EP | 1312874 | 5/2003 |
| EP | 1883933 | 2/2008 |
| FR | 2434463 | 8/1979 |
| GB | 2295484 | 5/1996 |
| GB | 2327722 | 1/1999 |
| GB | 2337722 | 12/1999 |
| JP | 59193000 | 11/1964 |
| JP | 62185199 | 8/1967 |
| JP | S59193000 | 11/1984 |
| JP | 10297678 | 11/1998 |
| JP | 11190799 | 7/1999 |
| JP | 2001056392 | 2/2001 |
| JP | 2001141891 | 5/2001 |
| JP | 2001264483 | 9/2001 |
| JP | 2003207597 | 7/2003 |
| JP | 2003240894 | 8/2003 |
| JP | 2004233055 | 8/2004 |
| KR | 200000000022 | 1/2000 |
| RU | 2168022 | 5/2001 |

OTHER PUBLICATIONS

U.S. Department of Energy. "Conceptual Design for a Wast-Management System that Uses Multipurpose Canisters," Jan. 1994 pp. 1-14.

Federal Register Environmental Documents, "Implementation Plan for the Environment Impact Statement for a Multi-Purpose Canister System for Management of Civilian and Neval Spent Nuclear Fuel," Aug. 30, 1995 (vol. 60, No. 168) pp. 1-7.

National Conference of State Legislatures, "Developing a Multi-purpose canister system for Spent Nuclear Fuel" State Legislative Report, col. 19, No. 4 by Sia Davis et al., Mar. 1, 1994, pp. 1-4.

Energy Storm Article, "Multi-purpose canister system evaluation: A systems engineering approach," Author unavailable, Sep. 1, 1994, pp. 1-2.

Science, Society, and America's Nuclear Waste—Teacher Guide, "The Role ofthe Multi-purpose Canister in the Waste Management System," Author—unknown. Date—Unknown, 5 pgs.

USEC Inc. Article. "NAC International: A Leader in Used Fuel Storage Technologies," copyright 2000, 2 pages.

Federal Register Notice, Dept. of Energy, "Record of Decision for a Multi-Purpose Canister or Comparable System,"vol. 64, No. 85, May 4, 1999.

Zorpette, Glenn: "Cannet Heat", Nuclear Power, Special Report, in IEEE Spectrum, Nov. 2001, pp, 44-47.

* cited by examiner

APPARATUS FOR STORING AND/OR TRANSPORTING HIGH LEVEL RADIOACTIVE WASTE, AND METHOD FOR MANUFACTURING THE SAME

CROSS-REFERENCE TO RELATED PATENT APPLICATIONS

Priority is claimed as a divisional application to U.S. patent application Ser. No. 12/774,944 (now U.S. Pat. No. 8,798,224), filed May 6, 2010, which claims priority to U.S. Provisional Patent Application Ser. No. 61/175,899, filed May 6, 2009. The aforementioned priority applications are incorporated herein by reference in their entirety as if set forth in full.

FIELD OF THE INVENTION

The present invention relates generally to apparatus, systems and methods for storing and/or transporting high level radioactive waste, and specifically to such apparatus, systems and methods that utilize a ventilated vertical overpack that allows natural convection cooling of the high level radioactive waste, which can be spent nuclear fuel ("SNF") in certain instances.

BACKGROUND OF THE INVENTION

In the operation of nuclear reactors, it is customary to remove fuel assemblies after their energy has been depleted down to a predetermined level. Upon removal, this SNF is still highly radioactive and produces considerable heat, requiring that great care be taken in its packaging, transporting, and storing. In order to protect the environment from radiation exposure, SNF is first placed in a canister, which is typically a hermetically sealed canister that creates a confinement boundary about the SNF. The loaded canister is then transported and stored in a large cylindrical container called a cask. Generally, a transfer cask is used to transport spent nuclear fuel from location to location while a storage cask is used to store SNF for a determined period of time.

In a typical nuclear power plant, an open empty canister is first placed in an open transfer cask. The transfer cask and empty canister are then submerged in a pool of water. SNF is loaded into the canister while the canister and transfer cask remain submerged in the pool of water. Once the canister is fully loaded with SNF, a lid is placed atop the canister while in the pool. The transfer cask and canister are then removed from the pool of water. Once out of the water, the lid of the canister is welded to the canister body and a cask lid is then installed on the transfer cask. The canister is then dewatered and backfilled with an inert gas. The transfer cask (which is holding the loaded canister) is then transported to a location where a storage cask is located. The loaded canister is then transferred from the transfer cask to the storage cask for long term storage. During transfer of the canister from the transfer cask to the storage cask, it is imperative that the loaded canister is not exposed to the environment.

One type of storage cask is a ventilated vertical overpack ("VVO"). A VVO is a massive structure made principally from steel and concrete and is used to store a canister loaded with spent nuclear fuel. Traditional VVOs stand above ground and are typically cylindrical in shape and are extremely heavy, often weighing over 150 tons and having a height greater than 16 feet. VVOs typically have a flat bottom, a cylindrical body having a cavity to receive a canister of SNF, and a removable top lid.

In using a VVO to store SNF, a canister loaded with SNF is placed in the cavity of the cylindrical body of the VVO. Because the SNF is still producing a considerable amount of heat when it is placed in the VVO for storage, it is necessary that this heat energy have a means to escape from the VVO cavity. This heat energy is removed from the outside surface of the canister by ventilating the VVO cavity. In ventilating the VVO cavity, cool air enters the VVO chamber through bottom ventilation ducts, flows upward past the loaded canister as it is warmed from the heat emanating from the canister, and exits the VVO at an elevated temperature through top ventilation ducts. Such VVOs do not require the use of equipment to force the air flow through the VVO. Rather, these VVOs are passive cooling systems as they use the natural air flow induced by the heated air to rise within the VVO (also know as the chimney effect).

While it is necessary that the VVO cavity be vented so that heat can escape from the canister, it is also imperative that the VVO provide adequate radiation shielding and that the SNF not be directly exposed to the external environment. The inlet duct located near the bottom of the overpack is a particularly vulnerable source of radiation exposure to security and surveillance personnel who, in order to monitor the loaded VVOs, must place themselves in close vicinity of the ducts for short durations. Therefore, when a typical VVO is used to store a canister of SNF in its internal cavity, the canister is supported in the cavity so that the bottom surface of the canister is higher than the top of inlet ventilation ducts. This is often accomplished by providing support blocks on the floor of the cavity. By positioning the bottom surface of the canister above the inlet ventilation ducts, a line of sight does not exist from the canister to the external atmosphere through the inlet ventilation ducts, thus eliminating the danger of radiation shine out of inlet ventilation ducts. However, as discussed below, positioning a canister in the cavity of a VVO so that the bottom surface of the canister is above the top of the inlet ventilation ducts creates two issues: (1) a potential cooling problem during a "smart flood" condition; and (2) an increased height of the VVO.

Subpart K of 10 C.F.R. § 72 provides for a "general certification" of casks for on-site storage of SNF. A number of casks have been licensed by the United States Nuclear Regulatory Committee ("U.S.N.R.C.") and are listed in subpart L of 10 C.F.R. § 72. These casks are certified to store a whole class of SNF (including SNF coming from pressurized water reactors (PWRs) or boiling water reactors (BWRs)). Unfortunately, reactors burn fuel in a wide variety of lengths. For example, PWRs in the U.S. presently burn fuel as short as 146" (e.g., Ft. Calhoun) and as long as 198" (e.g., South Texas). A general certified cask has been licensed in one or two fixed lengths (models) by the U.S.N.R.C. However, if the SNF is too long to fit in a licensed cask, then the cask simply cannot be used. Moreover, if the SNF is too short, then axial spacers are used to fill the open space in the storage cells to limit the movement of SNF in the axial direction. Thus, most casks and canisters used in the on-site storage of SNF have significant open spaces in their storage cells. This condition is particularly undesirable for VVOs because of the adverse consequence to the occupational dose to the plant personnel and cost (because of physical modifications forced on the plant), as set forth below.

First, the dose received by the workers performing the loading operations is directly influenced by the amount of shielding material per unit length in the body of the cask.

The total quantity of shielding that can be installed in a transfer cask is governed by the lifting capacity of the plant's cask crane. A longer than necessary transfer cask means less shielding per unit length installed in the cask which in turn results in increased dose to the workers.

In VVOs, the VVO is often loaded inside the plant's truck bay by stacking the transfer cask over the VVO. Minimizing the height of the VVO's body is essential to allow the VVO to be moved out through the plant's truck bay (typically, a roll-up door) after the canister is installed therein. The loaded VVO is typically moved out across the roll-up door without its lid, and the lid is then installed on it immediately after the VVO body clears the door. Therefore, a key objective in the storage VVO design is to minimize the height of VVO body.

In another variation, the transfer cask itself is taken outside through the plant's truck bay and carried over to a pit where the transfer of the canister to the VVO takes place. In this case, the height of the transfer cask must be short enough to clear the plant's roll-up door to avoid the need to shorten the transfer cask (or alternatively, to increase the height of the roll-up door). Shortening the transfer cask is not always possible.

SUMMARY OF THE INVENTION

The present invention, in one aspect, is a ventilated overpack having specially designed inlet ducts that allow a canister loaded with SNF (or other high level radioactive waste) to be positioned within the overpack so that a bottom end of the canister is below a top of the inlet ducts while still preventing radiation from escaping through the inlet ducts. This aspect of the present invention allows the overpack to be designed with a minimized height because the canister does not have to be supported in a raised position above the inlet ducts within the cavity of the overpack. Thus, it is possible for the height of the cavity of the overpack to be approximately equal to the height of the canister, with the addition of the necessary tolerances for thermal growth effects and to provide for an adequate ventilation space above the canister.

When the canister is supported within the overpack cavity so that the bottom end of the canister is below the top end of the inlet ducts, the canister is protected from over-heating during a "smart flood" condition because a substantial portion of the canister will become submerged in the flood water prior to the incoming air flow from the inlet duct being choked off. Moreover, the design and arrangement of inlet ducts of the inventive overpack result in the cooling air flow within the overpack to not be significantly impacted by high wind conditions exterior to the overpack.

In one embodiment, the invention can be an apparatus for transporting and/or storing high level radioactive waste comprising: an overpack body having an outer surface and an inner surface forming an internal cavity about a longitudinal axis; a base enclosing a bottom end of the cavity; a plurality of inlet ducts in a bottom of the overpack body, each of the inlet ducts extending from an opening in the outer surface of the overpack body to an opening in the inner surface of the overpack body so as to form a passageway from an external atmosphere to a bottom portion of the cavity; a columnar structure located within each of the inlet ducts, the columnar structures dividing each of the passageways of the inlet ducts into first and second channels that converge at the first and second openings, wherein for each inlet duct a line of sight does not exist between the opening in the inner surface of the overpack body and the opening in the outer surface of the overpack body; a lid enclosing a top end of the cavity; and a plurality of outlet ducts, each of the outlet ducts forming a passageway from a top portion of the cavity to the external atmosphere.

In another embodiment, the invention is an apparatus for transporting and/or storing high level radioactive waste comprising: a cylindrical radiation shielding body forming an internal cavity and having a vertical axis; a base enclosing a bottom end of the cavity; a plurality of inlet ducts in a bottom of the radiation shielding body, each of the inlet ducts forming a horizontal passageway from an external atmosphere to a bottom portion of the cavity; a radiation shielding structure located within each of the inlet ducts that divides the horizontal passageway of the inlet duct into at least first and second horizontally adjacent portions and blocks a line of sight from existing from the cavity to the external atmosphere through the inlet duct; a radiation shielding lid enclosing a top end of the cavity; and a plurality of outlet ducts, each of the outlet ducts forming a passageway from a top portion of the cavity to the external atmosphere.

In another aspect, the invention is directed to a method of utilizing a general license obtained for two different ventilated vertical overpacks to manufacture a third ventilated vertical overpack that is covered by the general license without filing an application for certification of the third ventilated vertical overpack.

In one embodiment, the invention can be a method of manufacturing a licensed ventilated vertical overpack without filing an application for certification comprising: designing a first ventilated vertical overpack comprising: a first cavity for receiving a first canister containing high level radioactive waste, the first cavity having a first horizontal cross section and a first height; a first ventilation system for facilitating natural convection cooling of the first canister within the first cavity, the first ventilation system comprising a first plurality of inlet vents for introducing cool air into a bottom of the first cavity and a first plurality of outlet vents for allowing heated air to escape from a top of the first cavity; and wherein the first ventilated vertical overpack is designed to withstand an inertial load resulting from a postulated tip-over event so as to maintain the integrity of the first canister within the cavity; designing a second ventilated vertical overpack comprising: a second cavity for receiving a second canister containing high level radioactive waste, the second cavity having a second horizontal cross section that is the same as the first horizontal cross section and a second height that is less than the first height; a second ventilation system for facilitating natural convective cooling of the second canister within the second cavity, the second ventilation system comprising a second plurality of inlet vents for introducing cool air into a bottom of the second cavity and a second plurality of outlet vents for allowing heated air to escape from a top of the second cavity, wherein the second plurality of inlet vents have the same configuration as the first plurality of inlet vents and the second plurality of outlet vents have the same configuration as the first plurality of outlet vents; and wherein the second ventilated vertical overpack is designed to achieve a heat rejection capacity; obtaining a license from a regulatory agency for the first and second ventilated vertical overpacks; manufacturing a third ventilated vertical overpack comprising: a third cavity for receiving a third canister containing high level radioactive waste, the third cavity having a third horizontal cross section that is the same as the first and second horizontal cross sections and a third height that is less than the first height and greater than the second height;

a third ventilation system for facilitating natural convective cooling of the third canister within the third cavity, the third ventilation system comprising a third plurality of inlet vents for introducing cool air into a bottom of the third cavity and a third plurality of outlet vents for allowing heated air to escape from a top of the third cavity, wherein the third plurality of inlet vents have the same configuration as the first and second plurality of inlet vents, and the third plurality of outlet vents have the same configuration as the first and second plurality of outlet vents; and wherein the third ventilated vertical overpack is automatically covered by the license without filing a new application for certification with the regulatory agency.

In another embodiment, the invention can be a method of manufacturing a licensed ventilated vertical overpack without filing an application for certification comprising: designing a first ventilated vertical overpack having a first cavity for receiving a first canister containing high level radioactive waste and having a structural configuration that can withstand an inertial load resulting from a postulated tip-over event so as to maintain the integrity of the first canister within the cavity, the first cavity having a first height that corresponds to a height of the first canister; designing a second ventilated vertical overpack having a second cavity for receiving a second canister containing high level radioactive waste and an inlet and outlet duct configuration for facilitating natural convective cooling of the second canister that achieves a heat rejection capacity, the second cavity having a second height that corresponds to a height of the second canister, the first height being greater than the second height; obtaining a license from a regulatory agency for the first and second ventilated vertical overpacks; manufacturing a third ventilated vertical overpack comprising: a third cavity for receiving a third canister containing high level radioactive waste, the third cavity having a third height that corresponds to a height of the third canister, the third height being greater than the second height and less than the first height; a structural configuration that is the same as the structural configuration of the first ventilated vertical overpack; and an inlet and outlet duct configuration for facilitating natural convective cooling of the third canister that is the same as the inlet and outlet duct configuration of the second ventilated vertical overpack; and wherein the first, second and third cavities have the same horizontal cross-sections and the first, second and third canisters have the same horizontal cross-sections; wherein the third ventilated vertical overpack is automatically covered by the license without filing a new application for certification with the regulatory agency.

DETAILED DESCRIPTION OF THE DRAWINGS

Figure 1:
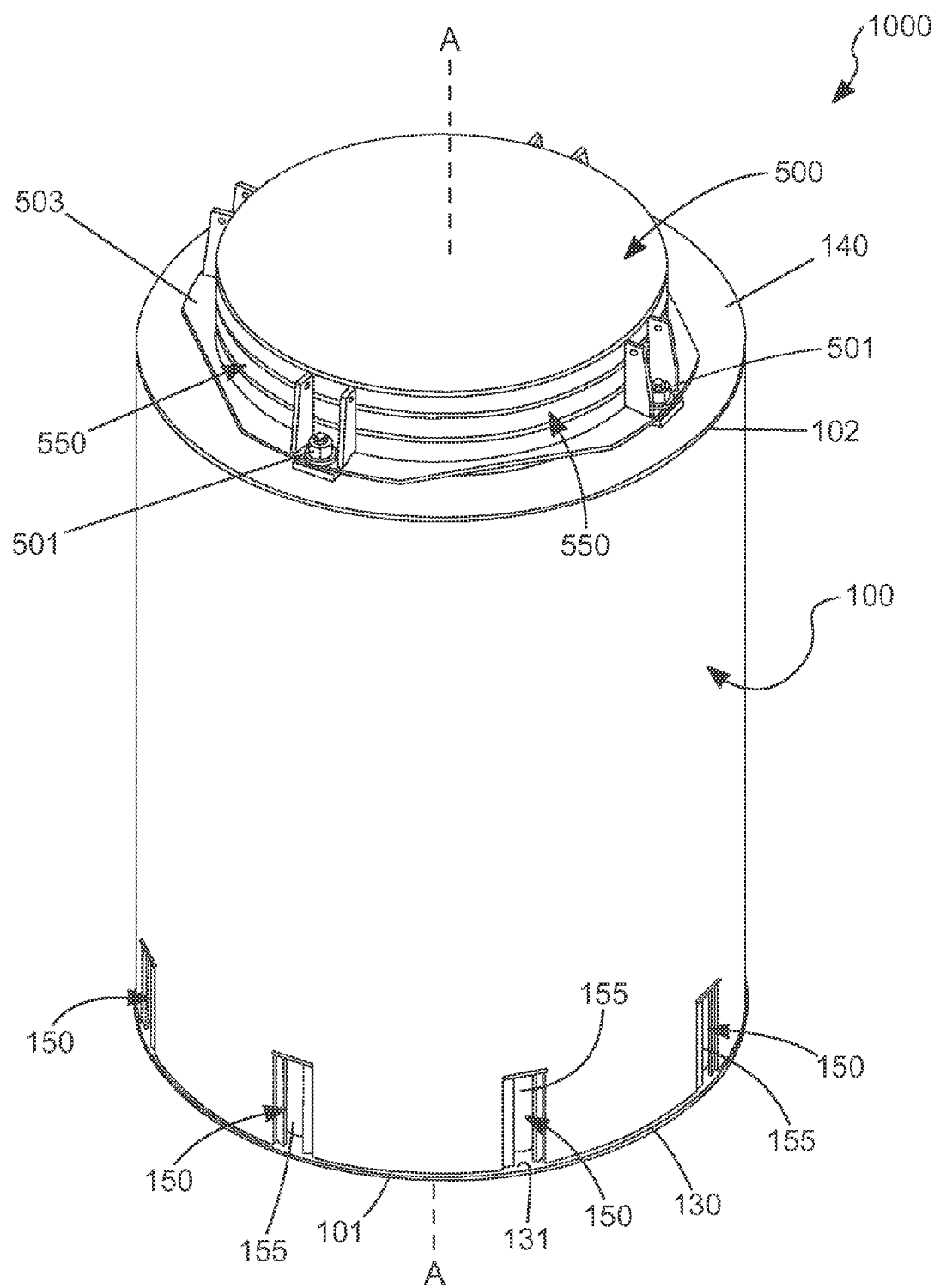
FIG. 1 is a top perspective view of VVO according to an embodiment of the present invention.
Figure 2:
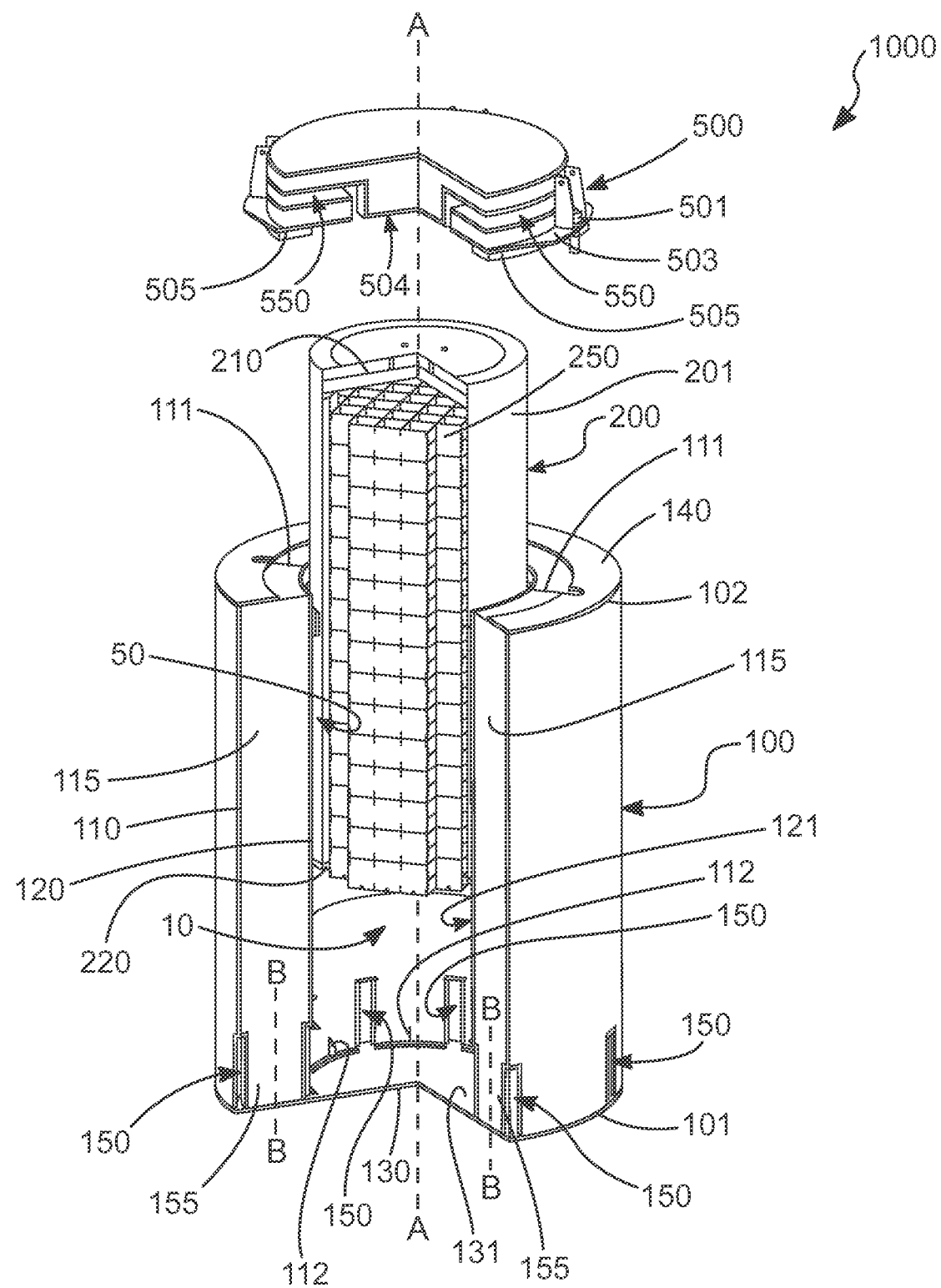
FIG. 2 is top perspective view of the VVO of FIG. 1 with the lid removed and a canister partially loaded within the VVO, wherein a section of the VVO and the canister is cutaway to facilitate viewing.
Figure 3:
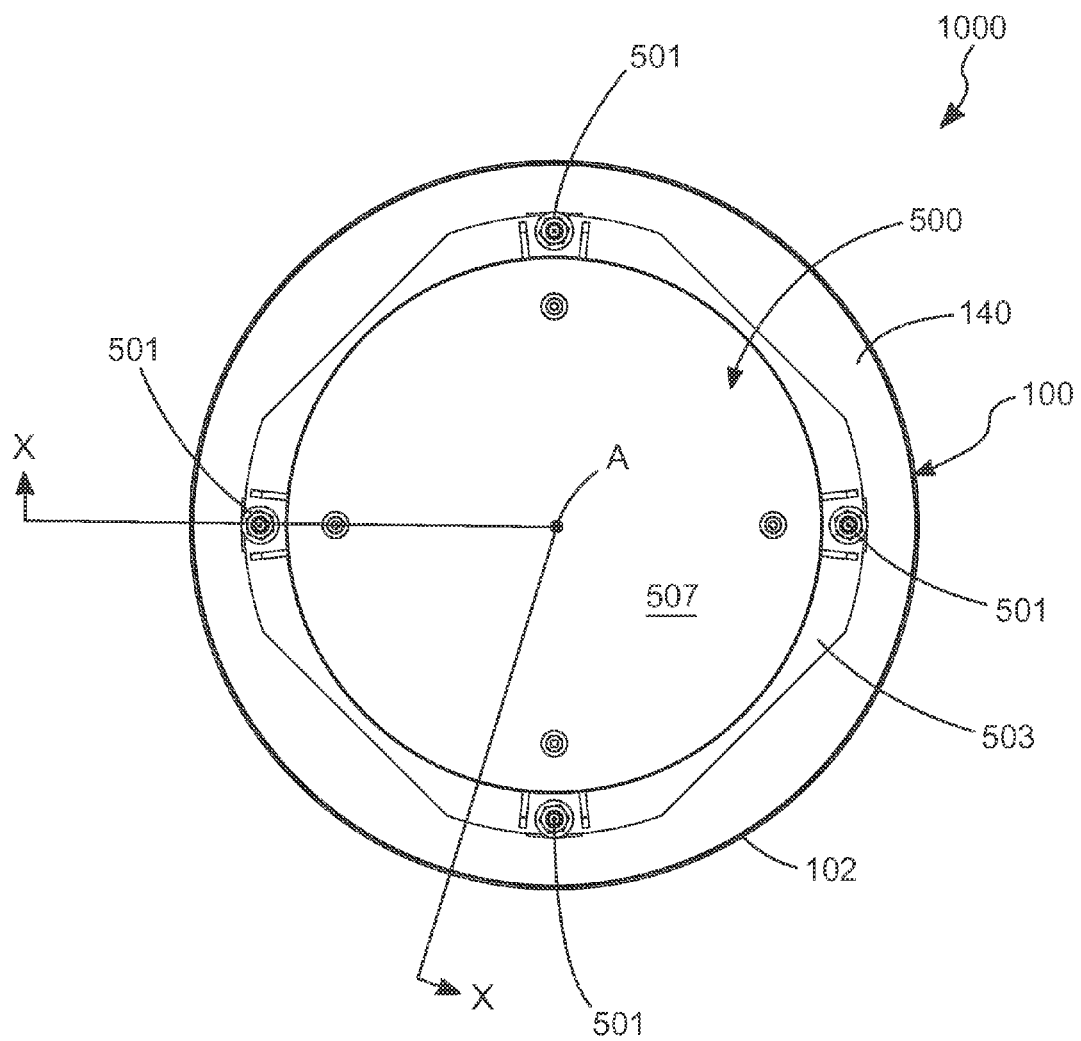
FIG. 3 is a top view of the VVO of FIG. 1.

Referring to FIGS. 1-4 concurrently, a ventilated vertical overpack ("VVO") 1000 according to an embodiment of the present invention is illustrated. The VVO 1000 is a vertical, ventilated, dry, SNF storage system that is fully compatible with 100 ton and 125 ton transfer casks for spent fuel canister transfer operations. The VVO 1000 can, of course, be modified and/or designed to be compatible with any size or style of transfer cask. Moreover, while the VVO 1000 is discussed herein as being used to store SNF, it is to be understood that the invention is not so limited and that, in certain circumstances, the VVO 1000 can be used to transport SNF from location to location if desired. Moreover, the VVO 1000 can be used in combination with any other type of high level radioactive waste.

The VVO 1000 is designed to accept a canister for storage at an Independent Spent Fuel Storage Installation ("ISFSI"). All canister types engineered for the dry storage of SNF can be stored in the VVO 1000. Suitable canisters include multi-purpose canisters ("MPCs") and, in certain instances, can include thermally conductive casks that are hermetically sealed for the dry storage of high level radioactive waste. Typically, such canisters comprise a honeycomb basket 250, or other structure, to accommodate a plurality of SNF rods in spaced relation. An example of an MPC that is particularly suited for use in the VVO 1000 is disclosed in U.S. Pat. No. 5,898,747 to Krishna Singh, issued Apr. 27, 1999, the entirety of which is hereby incorporated by reference.

The VVO 1000 comprises two major parts: (1) a dual-walled cylindrical overpack body 100 which comprises a set of inlet ducts 150 at or near its bottom extremity and an integrally welded baseplate 130; and (2) a removable top lid 500 equipped with radially symmetric outlet vents 550. The overpack body 100 forms an internal cylindrical storage cavity 10 of sufficient height and diameter for housing an MPC 200 fully therein. As discussed in greater detail below, the VVO 1000 is designed so that the internal cavity 10 has a minimized height that corresponds to a height of the MPC 200 which is to be stored therein. Moreover, the cavity 10 preferably has a horizontal (i.e., transverse to the axis A-A) cross-section that is sized to accommodate only a single MPC 200.

The overpack body 100 extends from a bottom end 101 to a top end 102. The base plate 130 is connected to the bottom end 101 of the overpack body 100 so as to enclose the bottom end of the cavity 10. An annular plate 140 is connected to the top end 102 of the overpack body 100. The annular plate 140 is ring-like structure while the base plate 130 is thick solid disk-like plate. The base plate 130 hermetically encloses the bottom end 101 of the overpack body 100 (and the storage cavity 10) and forms a floor for the storage cavity 10. If desired, an array of radial plate-type gussets 112 may be welled to the inner surface 121 of an inner shell 120 and a top surface 131 of the base plate 130. In such an embodiment, when the MPC 200 is fully loaded into the cavity 10, the MPC 200 will rest atop the gussets 112. The gussets 112 have top edges that are tapered downward toward the vertical central axis A-A. Thus, the gussets 112 guide the MPC 200 during loading and help situate the MPC 200 in a coaxial disposition with the central vertical axis A-A of the VVO 1000. In certain embodiments, the MPC 200 may not rest on the gussets 112 but rather may rest directly on the top surface 131 of the base plate 130. In such an embodiment, the gussets 112 may still be provided to not only act as guides for properly aligning the MPC 200 within the cavity 10 during loading but also to act as spacers for maintaining the MPC 200 in the desired alignment within the cavity 10 during storage.

By virtue of its geometry, the overpack body 100 is a rugged, heavy-walled cylindrical vessel. The main structural function of the overpack body is provided by its carbon steel components while the main radiation shielding function is provided by an annular plain concrete mass 115. The plain concrete mass 115 of the overpack body 100 is enclosed by concentrically arranged cylindrical steel shells 110, 120, the thick steel baseplate 130, and the top steel annular plate 140. A set of four equispaced steel radial connector plates 111 are connected to and join the inner and outer shells 110, 120 together, thereby defining a fixed width annular space between the inner and outer shells 120, 110 in which the plain concrete mass 115 is poured.

The plain concrete mass 115 between the inner and outer steel shells 120, 110 is specified to provide the necessary shielding properties (dry density) and compressive strength for the VVO 1000. The principal function of the concrete mass 115 is to provide shielding against gamma and neutron radiation. However, the concrete mass 115 also helps enhance the performance of the VVO 1000 in other respects as well. For example, the massive bulk of the concrete mass 115 imparts a large thermal inertia to the VVO 1000, allowing it to moderate the rise in temperature of the VVO 1000 under hypothetical conditions when all ventilation passages 150, 550 are assumed to be blocked. The case of a postulated fire accident at an ISFSI is another example where the high thermal inertia characteristics of the concrete mass 115 of the VVO 1000 controls the temperature of the MPC 200. Although the annular concrete mass 115 in the overpack body 100 is not a structural member, it does act as an elastic/plastic filler of the inter-shell space.

Four threaded steel anchor blocks (not illustrated) are also provided at the top of the overpack body 100 for lifting. The anchor blocks are integrally welded to the radial plates 111, which join the inner and outer shells 120, 110. The four anchor blocks are located at 90° angular spacings around the circumference of the top of the overpack body 100.

While the cylindrical body 100 has a generally circular horizontal cross-section, the invention is not so limited. As used herein, the term "cylindrical" includes any type of prismatic tubular structure that forms a cavity therein. As such, the overpack body can have a rectangular, circular, triangular, irregular or other polygonal horizontal cross-section. Additionally, the term "concentric" includes arrangements that are non-coaxial and the term "annular" includes varying width.

The overpack body 100 comprises a plurality of specially designed inlet vents 150. The inlet vents 150 are located at a bottom of the overpack body 100 and allow cool air to enter the VVO 1000. The inlet vents 150 are positioned about the circumference of overpack body 100 in a radially symmetric and spaced-apart arrangement. The structure, arrangement and function of the inlet vents 150 will be described in much greater detail below with respect to FIGS. 4-6 and 10.

Referring now to FIGS. 1-4 and 7 concurrently, the overpack lid 500 is a weldment of steel plates 510 filled with a plain concrete mass 515 that provides neutron and gamma attenuation to minimize skyshine. The lid 500 is secured to a top end 101 of the overpack body 100 by a plurality of bolts 501 that extend through bolt holes 502 formed into a lid flange 503. When secured to the overpack body 100, surface contact between the lid 500 and the overpack body 100 forms a lid-to-body interface. The lid 500 is preferably non-fixedly secured to the body 100 and encloses the top end of the storage cavity 10 formed by the overpack body 100.

The top lid 500 further comprises a radial ring plate 505 welded to a bottom surface 504 of the lid 500 which provides additional shielding against the laterally directed photons emanating from the MPC 200 and/or the annular space 50 (best shown in FIG. 9) formed between the outer surface 201 of the MPC 200 and the inner surface 121 of the inner shell 120. The ring plate 505 also assists in locating the top lid 500 in a coaxial disposition along axis A-A of the VVO 1000 through its interaction with the annular ring 140. When the lid 500 is secured to the overpack body 100, the outer edge of the ring plate 505 of the lid 500 abuts the inner edge of the annular plate 140 of the overpack body 100. A third function of the radial ring 501 is to prevent the lid 500 from sliding across the top surface of the overpack body 100 during a postulated tipover event defined as a non-mechanistic event for the VVO 1000.

As mentioned above, the lid 500 comprises a plurality of outlet vents 550 that allow heated air within the storage cavity 10 of the VVO 1000 to escape. The outlet vents 550 form passageways through the lid 500 that extend from openings 551 in the bottom surface 504 of the lid 500 to openings 552 in the peripheral surface 506 of the lid 500. While the outlet ducts 550 form L-shaped passageways in the exemplified embodiment, any other tortuous or curved path can be used so long as a clear line of sight does not exist from external to the VVO 1000 into the cavity 10 through the inlet ducts 550. The outlet vents 550 are positioned about the circumference of the lid 500 in a radially symmetric and spaced-apart arrangement. The outlet ducts 550 terminate in openings 552 that are narrow in height but axi-symmetric in the circumferential extent. The narrow vertical dimensions of the outlet ducts 550 helps to efficiently block the leakage of radiation. It should be noted, however, that while the outlet vents 550 are preferably located within the lid 500 in the exemplified embodiment, the outlet vents 550 can be located within the overpack body 100 in alternative embodiments, for example at a top thereof.

Figure 10:
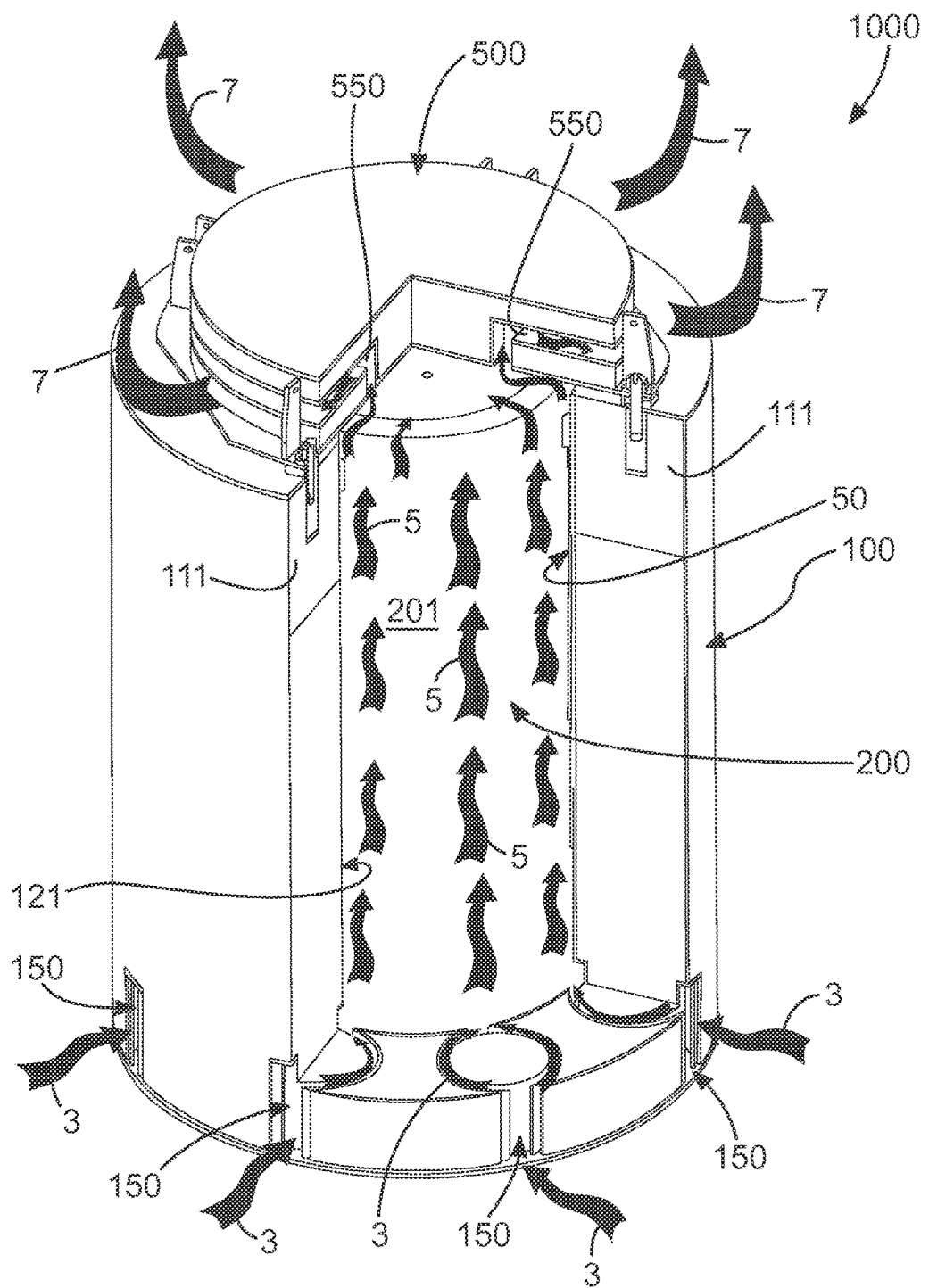
FIG. 10 is a cutaway perspective view of the VVO of FIG. 1 with an MPC positioned within the cavity of the VVO and with the natural convective cooling of the MPC schematically illustrated.

Referring briefly to FIG. 10, the purpose of the inlet vents 150 and the outlet vents 550 is to facilitate the passive cooling of an MPC 200 located within the cavity 10 of the VVO 1000 through natural convection/ventilation. In FIG. 10, the flow of air is represented by the heavy black arrows 3, 5, 7. The VVO 1000 is free of forced cooling equipment, such as blowers and closed-loop cooling systems. Instead, the VVO 1000 utilizes the natural phenomena of rising warmed air, i.e., the chimney effect, to effectuate the necessary circulation of air about the MPC 200 stored in the storage cavity 10. More specifically, the upward flowing air 5 (which is heated from the MPC 200) within the annular space 50 that is formed between the inner surface 121 of the overpack body 100 and the outer surface 201 of the MPC 200 draws cool ambient air 3 into the storage cavity 10 through inlet ducts 150 by creating a siphoning effect at the inlet ducts 150. The rising warm air 5 exits the outlet vents 550 as heated air 7. The rate of air flow through the VVO 1000 is governed by the quantity of heat produced in the MPC 200, the greater the heat generation rate, the greater the air upflow rate.

To maximize the cooling effect that the ventilating air stream 3, 5, 7 has on the MPC 200 within the VVO 1000, the hydraulic resistance in the air flow path is minimized to the extent possible. Towards that end, the VVO 1000 comprises eight inlet ducts 150 (shown in FIG. 6). Of course, more or less inlet ducts 150 can be used as desired. In one preferred embodiment, at least six inlet ducts 150 are used. Each inlet duct 150 is narrow and tall and has an internally refractive contour (shown in FIG. 6) so as to minimize radiation streaming while optimizing the size of the airflow passages. The curved shape of the inlet ducts 150 also helps minimize hydraulic pressure loss. The structure of the inlet ducts 150 will be described below in much greater detail with respect to FIGS. 4-6.

Referring back to FIGS. 1-4 and 7 concurrently, in order to decrease the amount of radiation scattered to the environment, an array of duct photon attenuators (DPAs) may be installed in the inlet and/or outlet ducts 150, 550. An example of a suitable DPA is disclosed in U.S. Pat. No. 6,519,307, the entirety of which is hereby incorporated by reference. The DPAs scatter any radiation streaming through the ducts 150, 550, thereby significantly decreasing the local dose rates around the ducts 150, 550. The configuration of the DPAs is such that the increase in the resistance to air flow in the air inlet ducts 150 and outlet ducts 550 is minimized.

The inlet ducts 150 permit the MPC 200 to be positioned directly atop the top surface 131 of the base plate 130 of the VVO 1000 if desired, thus minimizing the overall height of the cavity 10 that is necessary to house the MPC 200. Naturally, the height of the overpack body 100 is also minimized. Minimizing the height of the overpack body 100 is a crucial ALARA-friendly design feature for those sites where the Egress Bays in their Fuel Buildings have low overhead openings in their roll-up doors. To this extent, the height of the storage cavity 10 in the VVO 1000 is set equal to the height of the MPC 200 plus a fixed amount to account for thermal growth effects and to provide for adequate ventilation space above the MPC 200, as set forth in Table 1 below.

TABLE 1

OPTIMIZED MPC, TRANSFER CASK, AND VVO HEIGHT DATA FOR A SPECIFIC UNIRRADIATED FUEL LENGTH, l

| | |
|---|---|
| MPC Cavity Height, c | $l + \Delta^1$ |
| MPC Height (including top lid), h | c + 11.75" |
| VVO Cavity Height | H + 3.5" |
| Overpack Body Body Height (height from the bottom end to the top end of the overpack body) | H + 0.5" |
| Transfer Cask Cavity Height | h + 1" |
| Transfer Cask Height (loaded over the pad) | h + 27" |
| Transfer Cask Total Height | H + 6.5" |

[1]$\Delta$ shall be selected as $1.5" < \Delta < 2"$ so that c is an integral multiple of ½ inch (add 1.5" to the fuel length and round up to the nearest ½" or full inch).

As can be seen from Table 1, the first step in the height minimization plan is to minimize the height of the MPCs 200. The MPC cavity height, c, is customized for each plant (based on its fuel) so that there is no unnecessary (wasted) space.

The MPC 200 can be placed directly on the base plate 130 such that the bottom region of the MPC 200 is level with the inlet ducts 150 because radiation emanating from the MPC 200 is not allowed to escape through the specially shaped inlet ducts 150 due to: (1) the inlet ducts 150 having a narrow width and being curved in shape so as to wrap around a columnar structure 155 made of alloy steel or steel (or a combination of steel and concrete); (2) the configuration of the inlet ducts 150 is such that that there is no clear line of sight from inside the cavity 10 to the exterior environment; and (3) there is enough steel and/or concrete in the path of any radiation emanating from the MPC 200 to de-energize it to acceptable levels. The columnar structure 155 is configured to be cylindrical so as to be internally refractive, but it can also be of rectangular, elliptical, or other prismatic cross-sections to fulfill the essence of the above design features. With the radiation streaming problem at the inlet ducts 150 solved, the top 102 of the overpack body 100 can be as little as ½" higher than the top surface 202 of the MPC 200. Table 1 above gives typical exemplary dimensions but, of course, is not limiting of the present invention.

Figure 4:
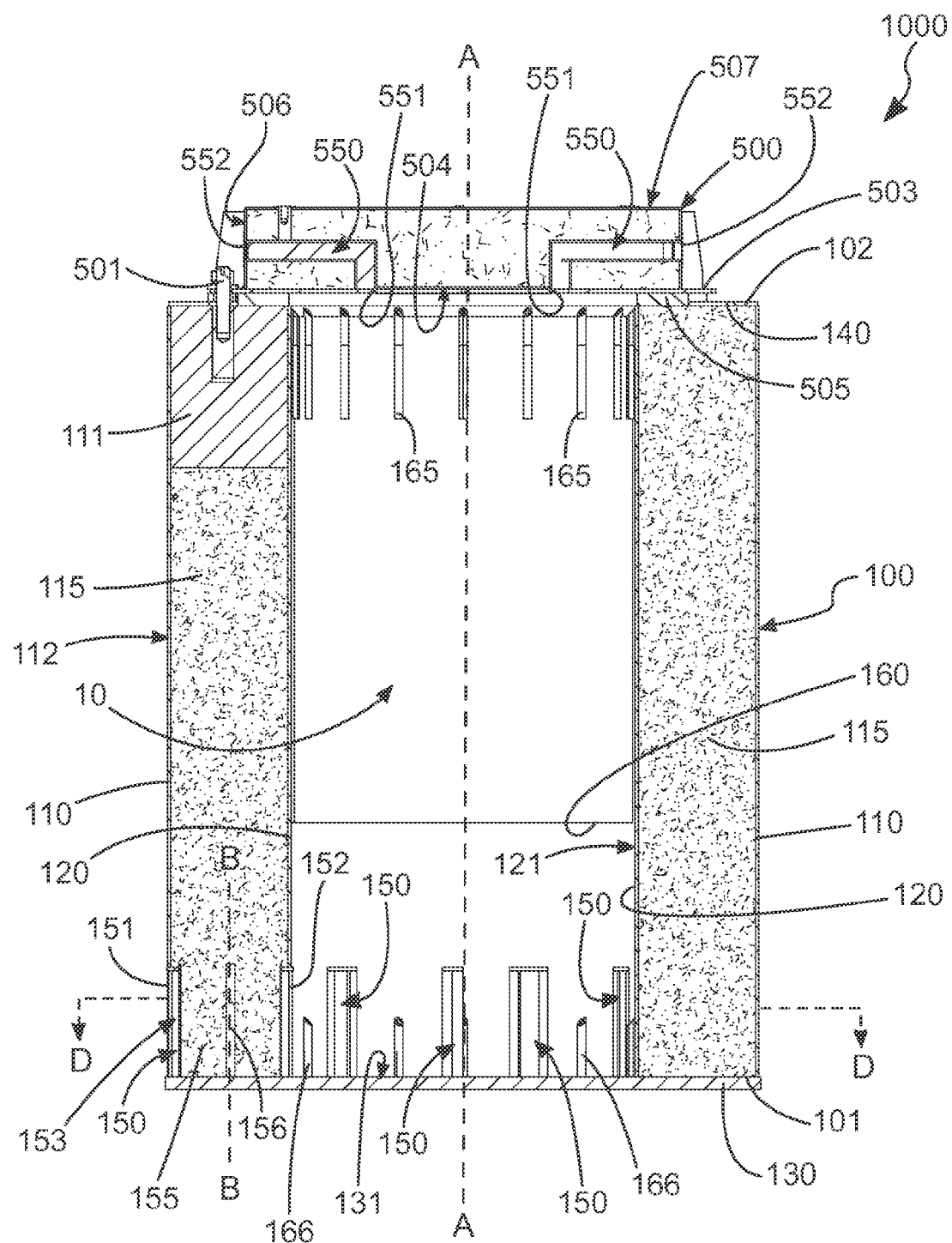
FIG. 4 is a vertical cross-sectional view of the VVO of FIG. 1 taken along view X-X of FIG. 3.

Finally, with reference to FIG. 4, to protect the concrete mass 115 of the VVO 1000 from excessive temperature rise due to radiant heat from the MPC 200, a thin cylindrical liner 160 of insulating material, can be positioned concentric with the inner shell 120. This insulating liner 140 is slightly smaller in diameter than the inner shell 120. The liner acts as a "heat shield" and can be hung from top impact absorbers 165 or can be connected directly to the inner shell 120 or another structure. The insulating layer 140 can be constructed of, without limitation, blankets of alumina-silica fire clay (Kaowool Blanket), oxides of alimuna and silica (Kaowool S Blanket), alumina-silica-zirconia fiber (Cerablanket), and alumina-silica-chromia (Cerachrome Blanket). The underside of the overpack lid 500 may also include a liner of insulating material if desired.

The top impact absorbers 165 are connected to the inner surface 121 of the inner shell 120 in a circumferentially spaced apart arrangement at or near the top end of the cavity 10. Similarly, bottom impact absorbers 166 are connected to the inner surface 121 of the inner shell 120 in a circumferentially spaced apart arrangement at or near the bottom end of the cavity 10. The top and bottom impact absorbers 165, 166 are designed to absorb kinetic energy to protect the MPC 200 during an impactive collision (such as a non-mechanistic tip-over scenario). In the exemplified embodiment, the top and bottom impact absorbers 165, 166 are hollow tube like structures but can be plate structures if desired. The impact absorbers 165, 166 serve as the designated locations of impact with the MPC lid 210 and the base plate 220 of the MPC 200 in case the VVO 1000 tips over. The impact absorbers 165, 166 are thin steel members sized to serve as impact attenuators by crushing (or buckling) against the solid MPC lid 210 and the solid MPC base 220 during an impactive collision (such as a non-mechanistic tip-over scenario).

Figure 5:
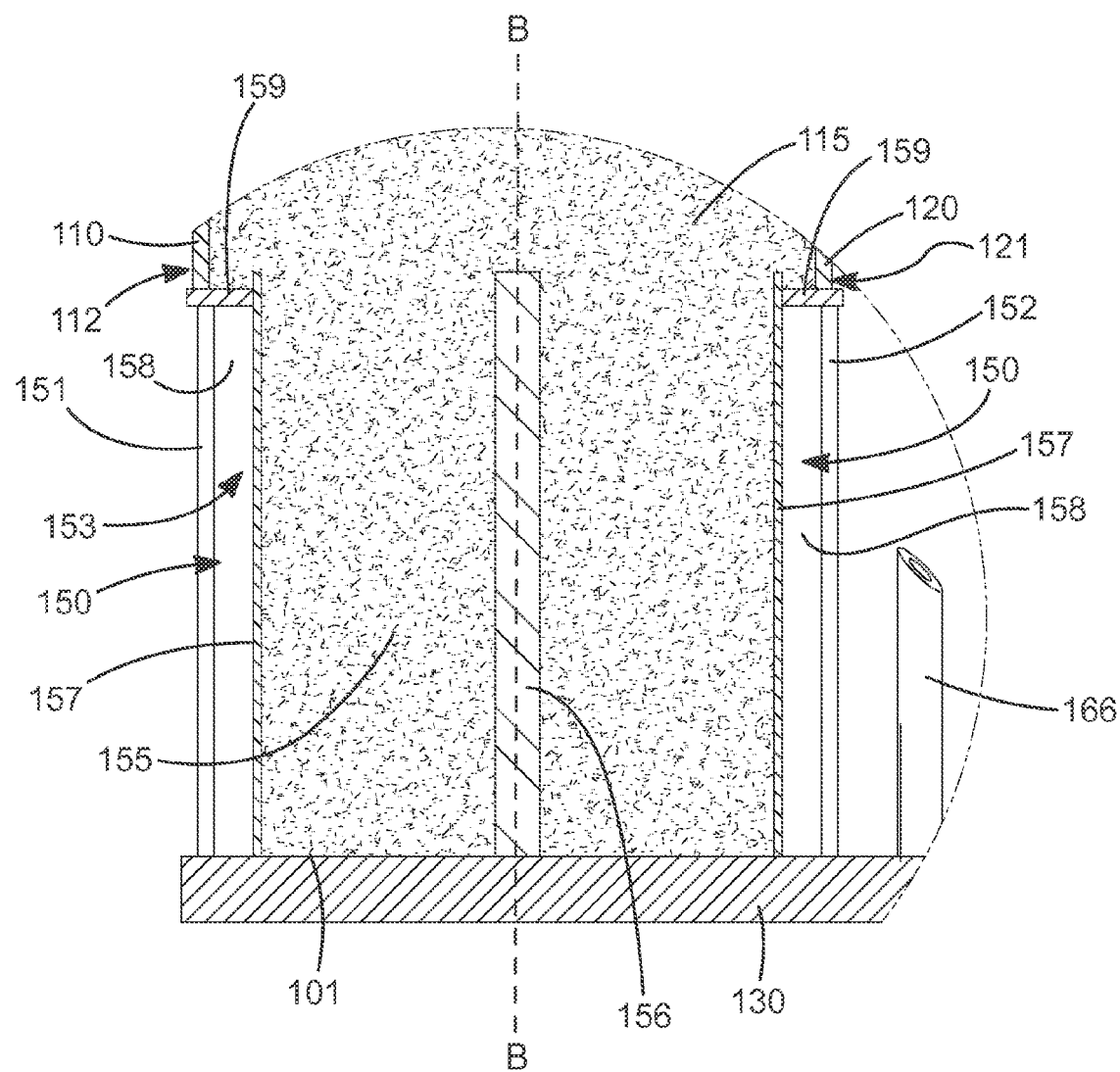
FIG. 5 is a close-up view of area V-V of FIG. 4 illustrating the detail of one of the inlet ducts, taken along a vertical reference plane that includes a central axis of the VVO.
Figure 6:
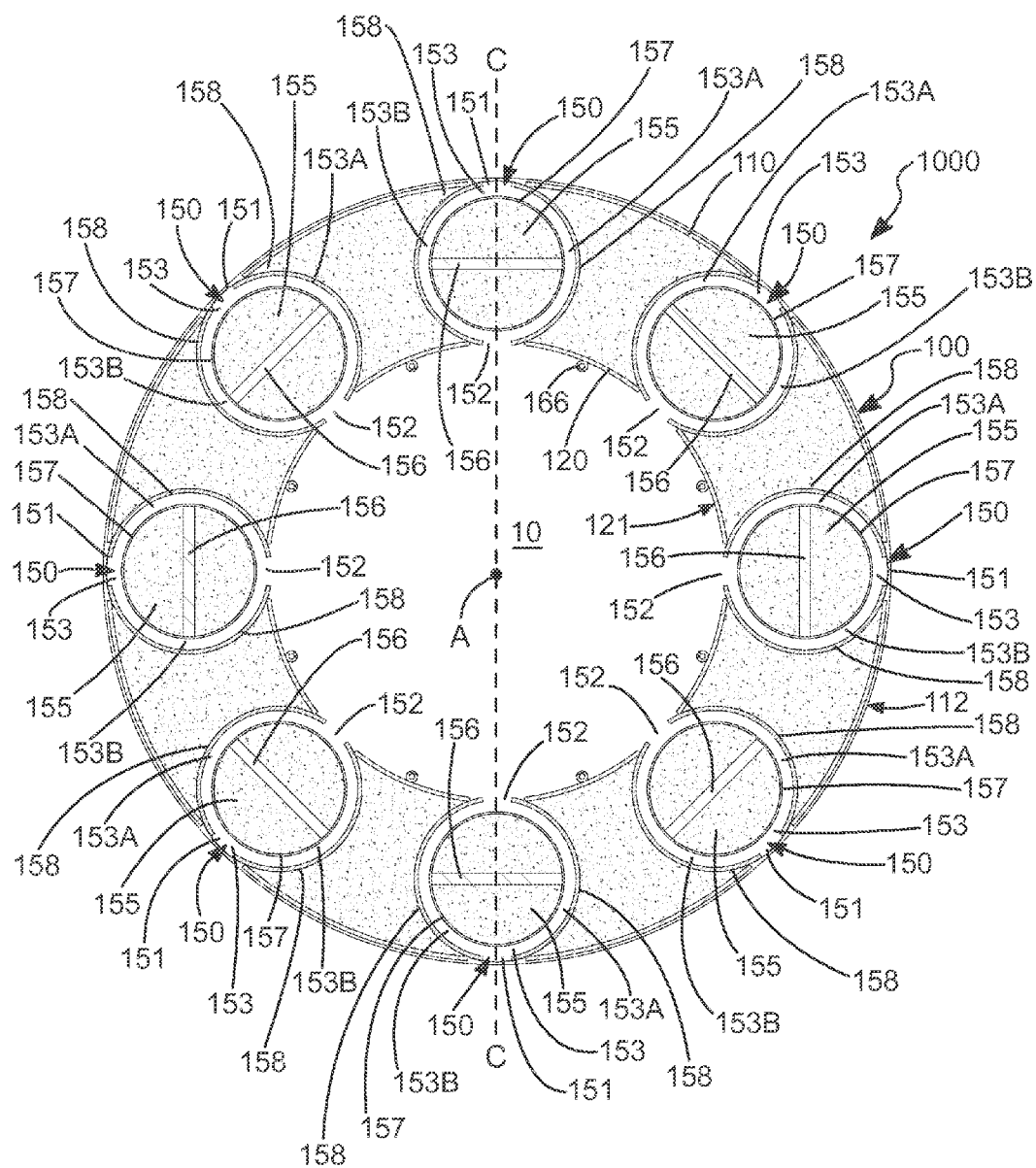
FIG. 6 is horizontal cross-sectional view of the VVO of FIG. 1 taken along horizontal reference plane D-D of FIG. 4.
Figure 7:
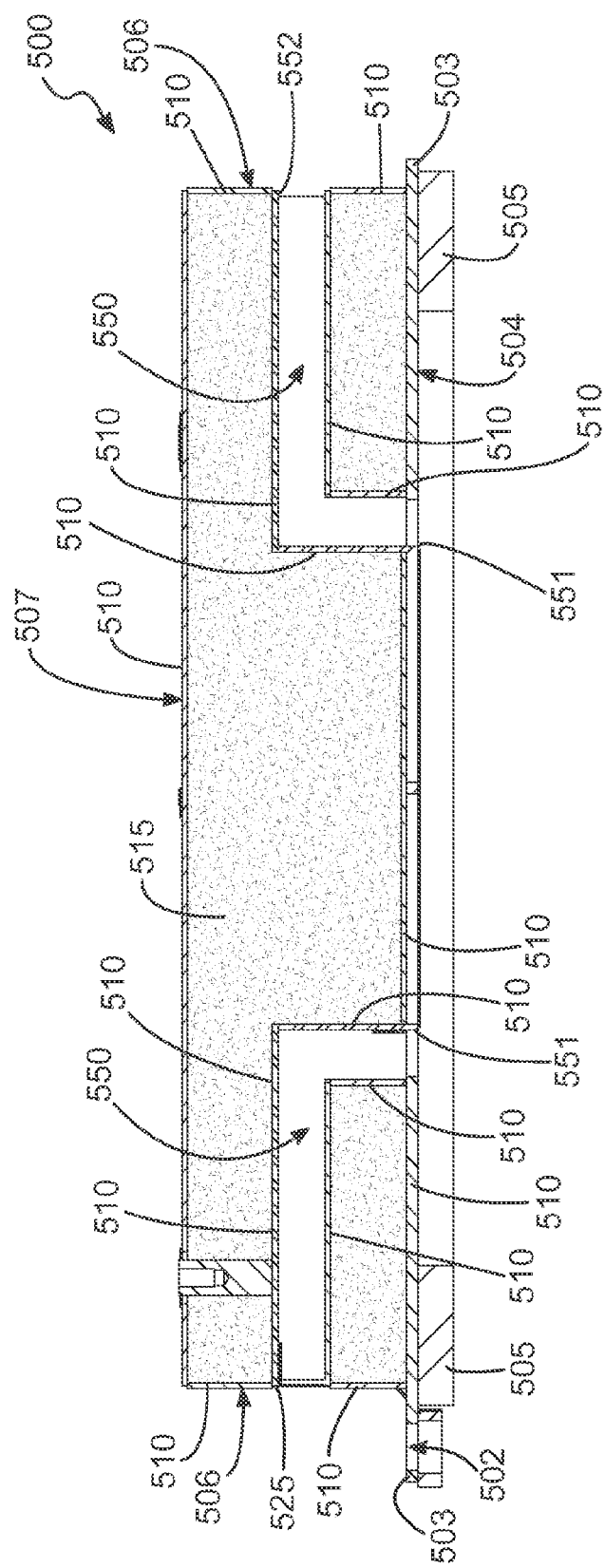
FIG. 7 is a horizontal cross-sectional view of the lid of the VVO of FIG. 1.

Referring now to FIGS. 4-6 concurrently, the details of the inlet ducts 150 will be discussed in detail. Generally, each of the inlet ducts 150 extends from an opening 151 in the outer surface 112 of the overpack body 100 (which in the exemplified embodiment is also the outer surface of the outer shell 110) to an opening 152 in the inner surface 121 of the overpack body 100 (which in the exemplified embodiment is also the inner surface of the inner shell 120). Each of the inlet ducts 150 forms a passageway 153 from an atmosphere external to the VVO 1000 to a bottom portion of the cavity 10 so that cool air can enter the cavity 10.

A columnar structure 155 is located within each of the inlet ducts 150. Each of the columnar structures 155 extend along their own longitudinal axis B-B. In the exemplified embodiment, the longitudinal axes B-B of the columnar structures 155 are substantially parallel with the central vertical axis A-A of the VVO 1000. Thought of another way, the longitudinal axes B-B extend in the load bearing direction of the overpack body 100. Of course, the invention will not be so limited in all embodiments and the longitudinal axes B-B of the columnar structures 155 may be oriented in a different manner if desired.

The columnar structures 155 are formed by a combination of steel plates 156, 157 and concrete 115. The plates 157 are cylindrical in shape and bound the outer circumferences of the columnar structures 155, thereby forming the outer surfaces of the columnar structures 155. The plates 156 are flat plates that are thicker than the plates 157 and are centrally positioned within the columnar structures 155 so as to extend along the axes B-B. The plates 156 provide structural integrity to the columnar structures 155 (similar to rebar) and also add additional gamma shielding to the columnar structures 155. The columnar structures 155 have a transverse cross-section that is circular in shape. However, the invention is not so limited and the columnar structures 155 can have a transverse cross-section of any prismatic shape.

The columnar structures 155 divide each of the passageways 153 of the inlet ducts 150 into a first channel 153A and a second channel 153B. For each inlet duct 150, the first and second channels 153A, 153B converge at both openings 151, 152, thereby collectively surrounding the entire circumference of the outer surface of the columnar structure 155. Thought of another way, for each inlet duct 150, the first and second channels 153A, 53B collectively circumferentially surround the longitudinal axes B-B of the columnar structures 155, forming a circular (or other prismatic) passageway contained within the walls of the overpack body 100.

Figure 8:
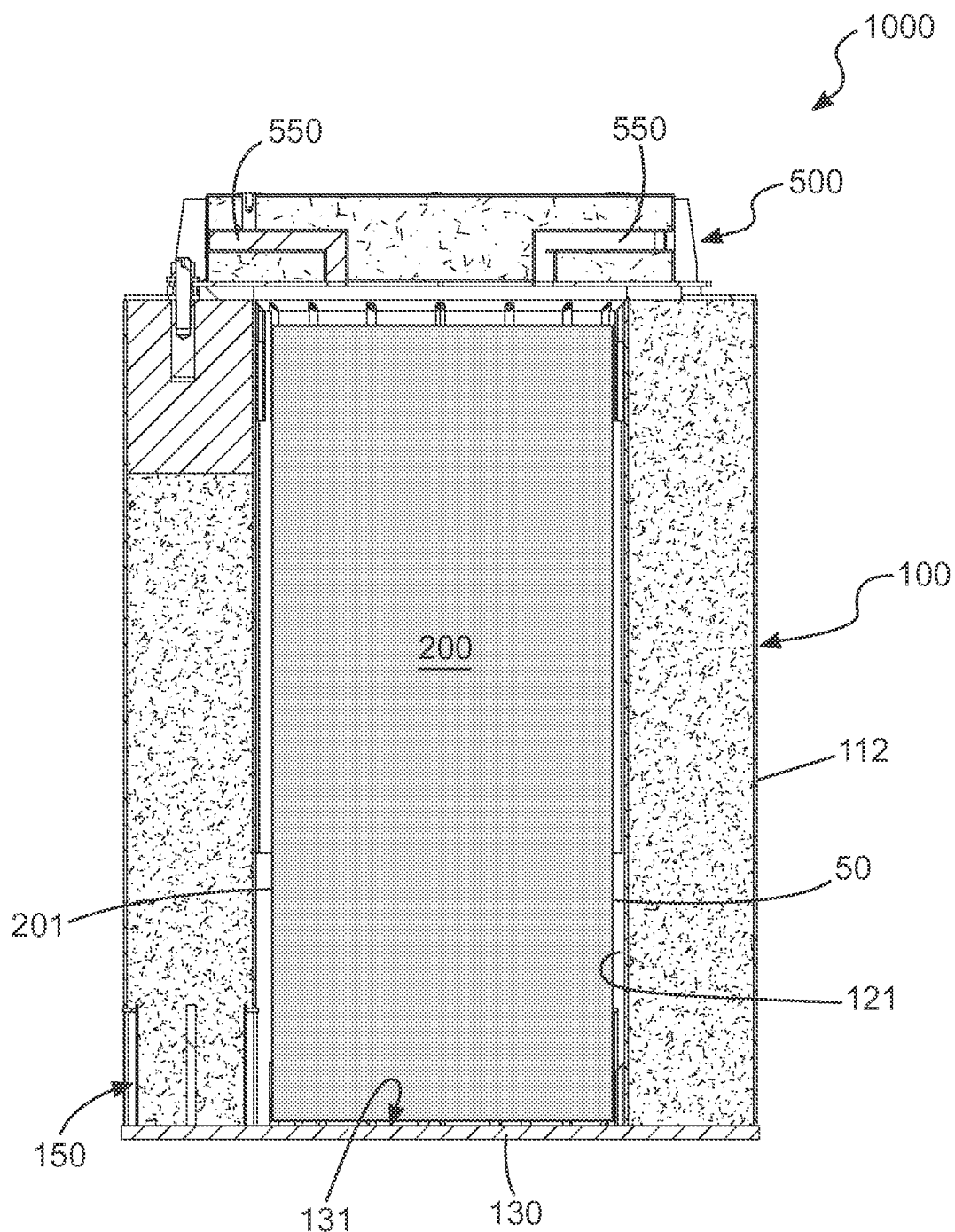
FIG. 8 is vertical cross-sectional view of the VVO of FIG. 1 with a multi-purpose canister ("MPC") positioned within the cavity of the VVO according to an embodiment of the present invention.
Figure 9:
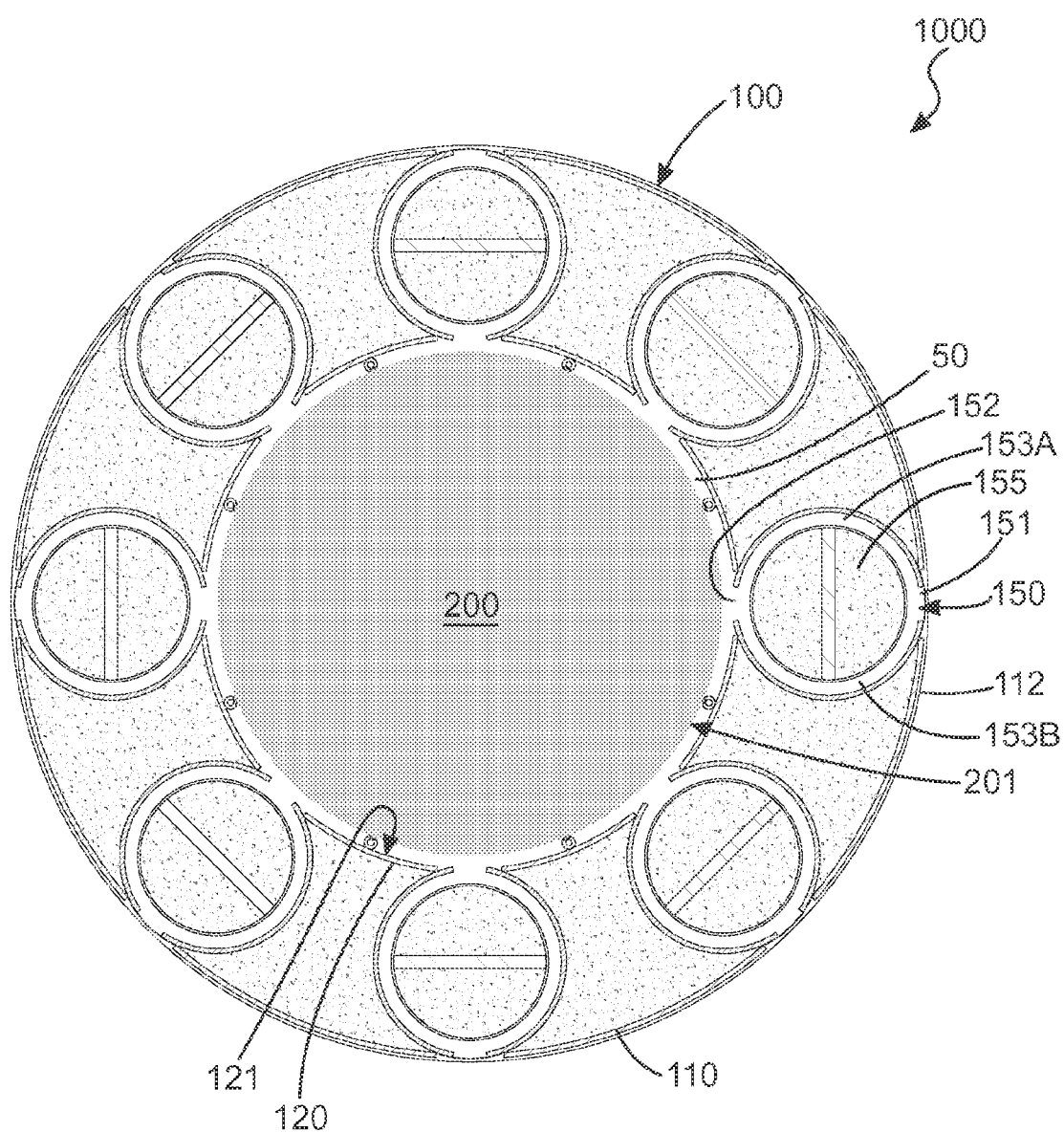
FIG. 9 is the horizontal cross-sectional view of FIG. 6 with an MPC positioned within the cavity of the VVO according to an embodiment of the present invention.

Importantly, for each inlet duct 150, a line of sight does not exist between the opening 152 in the inner surface 121 of the overpack body 100 and the opening 151 in the outer surface 112 of the overpack body 100. This is because the columnar structures 155 block such a line-of-sight and provide the required radiation shielding, thereby preventing radiation shine into the environment via the inlet ducts 150. As such, the MPC 200 can be positioned within the cavity 10 so as to be horizontally and vertically aligned with the inlet ducts 150 without radiation escaping into the external environment (see FIGS. 8-9). Stated conceptually, for each inlet duct 150, the opening 152 in the inner surface 121 of the overpack body 100 is aligned with the opening 151 in the outer surface 112 of the overpack body 100 so that: (i) a first reference plane D-D that is perpendicular to the longitudinal axis A-A of the overpack body 100 intersects both the opening 152 in the inner surface 121 of the overpack body 100 and the opening 151 in the outer surface 112 of the overpack body 100; and (ii) a second reference plane C-C that is parallel with and includes the longitudinal axis A-A of the overpack body 100 intersects both the opening 152 in the inner surface 121 of the overpack body 100 and the opening 151 in the outer surface 112 of the overpack body 100. When an MPC 200 is positioned in the cavity 10 as shown in FIGS. 8-9, the MPC 200 is also intersected by the reference plane C-C and the reference plane D-D.

The inlet vents 150 (and thus the first and second channels 153A, B) are lined with steel. For each inlet duct 160, the steel liner includes the cylindrical plate 157 of the columnar structure 155, two arcuate wall plates 158, an annular roof plate 159, and the base plate 130. All connections between these plates can be effectuated by welding. As can best be seen in FIGS. 5 and 6, the width of the first and second channels 153A, B is defined by a gap located between the cylindrical plate 157 of the columnar structure 155 and the two arcuate plates 158. Preferably, the cylindrical plate 157 of the columnar structure 155 and the two arcuate plates 158 are arranged in a concentric and evenly spaced-apart manner so that the first and second channels 153A, B have a constant width. Most preferably, the first and second channels 153A, B are curved so as to reduce hydraulic pressure loss. Finally, it is also preferred that the inlet ducts 150 have a height that is at least three times that of its width.

Referring now to FIGS. 8-11 concurrently, the benefits achieved by the special design of the inlet ducts 150 with respect to MPC 200 storage will be discussed. During use of the VVO 1000, an MPC 200 is positioned within the cavity 10. An annular gap 50 exists between the outer surface 201 of the MPC 200 and the inner surface 121 of the overpack body 100 The annular gap 50 creates a passageway along the outer surface 201 of the MPC 200 that spatially connects the inlet vents 150 to the outlet vents 550 so that cool air 3 can enter VVO 1000 via the inlet vents 150, be heated within the annular space 50 so as to become warm air 5 that rises within the annular space 50, and exit the VVO 1000 via the outlet vents 550.

The MPC 200 is supported within the cavity 10 so that the bottom surface of the MPC 200 rests directly atop the top surface 131 of the base plate 130. This is made possible because the inlet ducts 150 are shaped so as not to allow radiation to shine therethrough because a clear line-of-sight does not exist from the cavity 10 to the atmosphere outside of the VVO 1000 through the inlet ducts 150. Thus, the cavity 10 (and as a result the overpack body 100) can be made as short as possible and substantially correspond to the height of the MPC 200, as discussed above with respect to Table 1.

Figure 11:
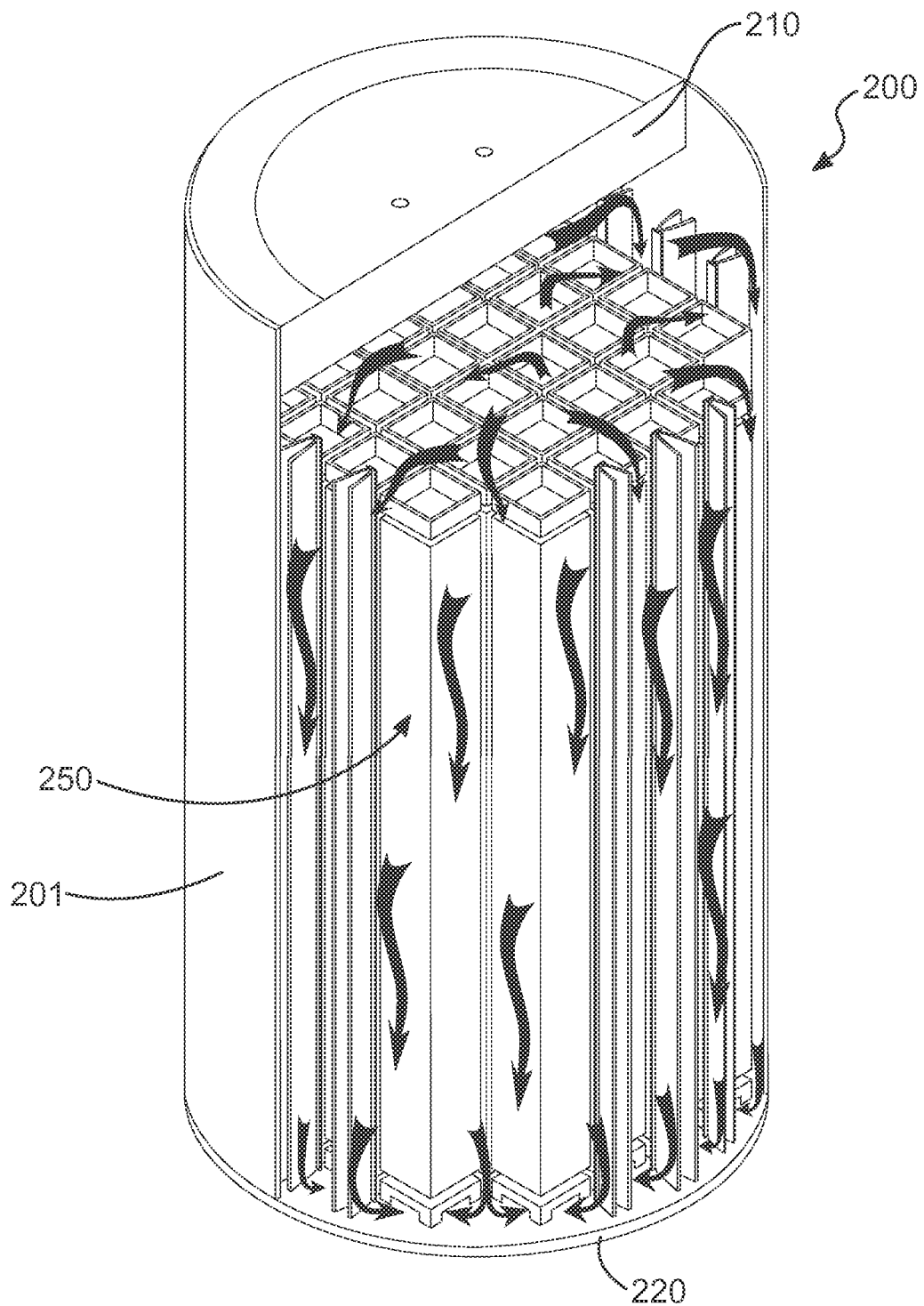
FIG. 11 is a cutaway perspective view of an MPC according to an embodiment of the present invention wherein the internal thermosiphon flow of inert gas within the MPC is schematically illustrated.

Additionally, positioning the MPC 200 in the cavity 10 so that the bottom surface of the MPC 200 is below the top of the opening 152 of the inlet vents 150 ensures adequate MPC cooling during a "smart flood condition." A "smart flood" is one that floods the cavity 10 so that the water level is just high enough to completely block airflow though the inlet ducts 150. In other words, the water level is just even with the top of the openings 152 of the inlet ducts 150. Because the bottom surface of the MPC 200 is situated at a height that is below the top of the openings 152 of the inlet ducts 150, the bottom of the MPC 200 will be in contact with (i.e. submerged in) the water during a "smart flood" condition. Because the heat removal efficacy of water is over 100 times that of air, a wet bottom is all that is needed to effectively remove heat and keep the MPC 200 cool. The MPC cooling action effectively changes from ventilation air-cooling to evaporative water cooling. Additionally, as shown in FIG. 11, the MPC 200 is particularly suited for "smart-flood" cooling because the MPC 200 is designed to achieve an internal natural thermopshion cyclical flow. Thus, in a smart-flood," the thermosiphon flow in the MPC 200 will circulate the internal gas so that the hot gas is circulated to the top of the MPC where its heat can be effectively removed.

As mentioned above, the design discussed above for the VVO 1000 allows the VVO 1000 to be constructed so that the height of the cavity 10 (and thus the VVO 1000) is minimized to the extent possible to accommodate an MPC 200 that, in turn, corresponds in height to the length of the SNF assemblies at issue. It has been further discovered that because the MPC 200 does not have to be positioned above the inlet ducts 150, the same configuration of inlet ducts 150 can be used for any and all VVOs 1000, irrespective of the height of the MPC 200 to be positioned therein. Additionally, it has been further discovered that if the outer horizontal cross-section of the MPC 200 and the inner horizontal cross-section of the VVO 1000 are also kept constant, that it is possible to manufacture VVOs 1000 of variable heights under a single N.R.C. (or other regulatory agency) license without having to obtain a new license, so long as a taller and shorter version of the VVO 1000 has already been licensed.

Licensing of the shorter VVO 1000 is necessary because the shorter a VVO 1000 is, the less effective the heat rejection capacity of that VVO's natural ventilation system becomes. This is because decreasing the height of the MPC 200 results in a decreased upward flow of air within the annular space 50, thereby reducing the ventilation of the MPC 200. Licensing of the taller VVO 1000 is necessary because the taller a VVO 1000 is, the more susceptible it becomes to inertial loading resulting from a postulated tip-over event that would destroy the integrity of the MPC 200 within the cavity 10. Stated simply, assuming that the ventilation system of the taller and shorter VVOs are held constant, if the shorter VVO meets the required heat rejection capacity, it can be assumed that all taller VVOs will also meet the required heat rejection capacity. Similarly, assuming that the structural configuration of the taller and shorter VVOs are held constant, if the taller VVO can withstand an inertial load resulting from a postulated tip-over event and maintain the integrity of the MPC within its cavity, it can be assumed that all shorter VVOs will also withstand the inertial load resulting from the postulated tip-over event and maintain the integrity of the MPC within its cavity. As used herein, the structural configuration of two VVOs are held constant if the structural components and arrangements remain the same, with exception of the height of the shells 110, 120 and possibly the diameter of the outer shell 110.

Thus, in on embodiment, the invention is directed to a method of designing embodiments of the VVO 1000 so that its height is variable and greater than the plant's fuel length by a certain fixed amount. Thus, VVOs 1000 of varying heights can be manufactured under a single U.S.N.R.C. license and be suitable to store SNF in an optimized configuration at all nuclear plants in the world. An embodiment of the present invention will now be described in relation to VVO 1000 discussed above with the addition to suffixes "A-C" to distinguish between the tall version of the VVO 1000A the short version of the VVO 1000B, and the intermediate version of the VVO 1000C respectively.

According to one embodiment of the present invention, a VVO 1000A having a first cavity 10A for receiving a first MPC 200A containing high level radioactive waste is designed. This first VVO 1000A comprises a structural configuration that can withstand an inertial load resulting from a postulated tip-over event of the VVO 1000A so as to maintain the integrity of the first MPC 200A within the cavity. The first cavity 100A has a first height H1 that corresponds to the height of the first MPC 200A as discussed above in relation to Table 1.

A second VVO 1000B having a second cavity 10B for receiving a second MPC 200B containing high level radioactive waste is then be designed. The second VVO 1000B comprises a configuration of inlet and outlet ducts 150B, 550B for facilitating natural convective cooling of the second MPC 200B that achieves a required heat rejection capacity. The second cavity 10B has a second height H2 that corresponds to the height of the second MPC 200B as discussed above in relation to Table 1. The first height H1 is greater than the second height H2.

The designs of the first and second VVOs 1000A, 1000B are then submitted to the appropriate regulatory agency, such as the U.S.N.R.C., for licensing. A license is obtained from the regulatory agency for the first and second VVOs 1000A, 1000B.

After the licenses are obtained, a third VVO 1000C comprising a third cavity 10C for receiving a third MPC 200C containing high level radioactive waste is manufactured. The third cavity 10C has a third height H3 that corresponds to a height of the third MPC 200C as discussed above in relation to Table 1. The third height H3 is greater than the second height H2 and less than the first height H1. The VVO 1000C is manufactured to have a structural configuration that is the same as the structural configuration of the first VVO 1000A and a configuration of inlet and outlet ducts 150C, 550 for facilitating natural convective cooling of the third MPC 200C that is the same as the configuration of the inlet and outlet ducts 150B, 550B of the second VVO 1000B. The first, second and third cavities 10A, 10B, 10C all have the same horizontal cross-sections and the first, second and third MPCs 200A, 200B, 200C all have the same outer horizontal cross-sections.

Thus, the third VVO 1000C will automatically be covered by the license granted for the VVOs 1000A and 1000B without filing a new application for certification with the regulatory agency.

In the example above, the taller VVO 1000A may also be designed to comprise a configuration of inlet and outlet ducts 150A, 550A for facilitating natural convective cooling of the second MPC 200B that achieves a required heat rejection capacity. The configuration of inlet and outlet ducts 150A, 550A may be the same as the configuration of inlet and outlet ducts 150B, 550B of the shorter VVO 1000B. Similarly, the shorter VVO 1000B may also be designed to comprise a structural configuration that can withstand an inertial load resulting from a postulated tip-over event of the VVO 1000B so as to maintain the integrity of the first MPC 200B within the cavity 10B. The structural configuration of the VVO 1000B may be the same as the structural configuration of the VVO 1000A.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An apparatus for transporting and/or storing high level radioactive waste comprising:
   a cylindrical radiation shielding body forming an internal cavity and having a vertical axis;

a base enclosing a bottom end of the cavity;

a plurality of inlet ducts in a bottom of the radiation shielding body, each of the inlet ducts comprising an inner opening in an inner surface of the body and an outer opening in an outer surface of the body, the inlet ducts each forming a separate horizontal airflow passageway having a circuitous configuration from external atmosphere to a bottom portion of the cavity;

a radiation shielding structure located within each of the inlet ducts that divides the horizontal passageway of the inlet duct into a first channel and a second channel on opposite sides of the radiation shielding structure, the first and second channels converging at the inner and outer openings;

wherein the radiation shielding structure is configured to block a line of sight between the inner and outer openings.

2. An apparatus for transporting and/or storing high level radioactive waste comprising:

a cylindrical radiation shielding body forming an internal cavity and having a vertical axis;

a base enclosing a bottom end of the cavity;

a plurality of inlet ducts in a bottom of the radiation shielding body, each of the inlet ducts forming a horizontal passageway from an external atmosphere to a bottom portion of the cavity;

a radiation shielding structure located within each of the inlet ducts that divides the horizontal passageway of the inlet duct into first and second channels;

each radiation shielding structure comprising a concrete core encased in a metal plate;

the first and second channels of the radiation shielding structure being adjacent portions and blocks a line of sight existing from the cavity to the external atmosphere through the inlet duct;

a radiation shielding lid enclosing a top end of the cavity; and a plurality of outlet ducts, each of the outlet ducts forming a passageway from a top portion of the cavity to the external atmosphere;

wherein the radiation shielding structure is configured to block a line of sight from the cavity to the external atmosphere through the inlet duct.

3. The apparatus of claim 1 further comprising a hermetically sealed canister for containing high level radioactive waste positioned within the cavity so that the canister rests atop the base.

4. The apparatus of claim 1 further comprising a lid enclosing a top end of the cavity that comprises the outlet ducts, each of the outlet ducts extending from an opening in an inner surface of the lid to an opening in an outer surface of the lid.

5. The apparatus of claim 1 wherein the radiation shielding structures each have a longitudinal axis, and the longitudinal axis of the radiation shielding structures are substantially parallel with the vertical axis of the cylindrical radiation shielding body.

6. The apparatus of claim 5 wherein for each radiation shielding structure, the first and second channels are symmetrical about the longitudinal axis of the radiation shielding structure.

7. The apparatus of claim 1 wherein the cylindrical radiation shielding body comprises an inner shell and an outer shell concentrically arranged so that a gap exists between the inner and outer shells, the gap filled with a radiation shielding material comprising concrete.

8. The apparatus of claim 1 wherein the cavity has a transverse cross-section which accommodates no more than one of the canisters.

9. The apparatus of claim 1 wherein the openings in the outer and inner surfaces of the cylindrical radiation shielding body are vertically aligned with each.

* * * * *